United States Patent [19]

Valdois et al.

[11] Patent Number: 4,547,691
[45] Date of Patent: Oct. 15, 1985

[54] PIEZOELECTRIC PRESSURE AND/OR TEMPERATURE TRANSDUCER

[75] Inventors: Michel Valdois, Cachan; Pierre Maitre, Pirey par Miserey; Raymond Besson; Jean-Jacques Boy, both of Besancon, all of France

[73] Assignee: Schlumberger Technology Corporation, New York, N.Y.

[21] Appl. No.: 520,289

[22] Filed: Aug. 4, 1983

[30] Foreign Application Priority Data

Aug. 5, 1982 [FR] France ............................ 82 13746

[51] Int. Cl.⁴ ............................................. H01L 41/08
[52] U.S. Cl. .................................. 310/361; 310/338; 310/346; 310/367; 310/369
[58] Field of Search ............... 310/346, 361, 367, 368, 310/369, 338, 346

[56] References Cited

U.S. PATENT DOCUMENTS

| | | | |
|---|---|---|---|
| 3,339,091 | 8/1967 | Hammond et al. | 310/346 |
| 3,561,832 | 2/1971 | Kevser et al. | 36/338 |
| 3,617,780 | 11/1971 | Benjaminson | 310/346 |
| 3,805,097 | 4/1974 | Yanchich | 310/346 X |
| 4,144,747 | 3/1979 | Datwyler | 310/338 |

*Primary Examiner*—Mark O. Budd

[57] ABSTRACT

In a piezoelectric transducer (10) an external element (12) of tubular form receives a pressure, notably a pressure to be measured, on its external face (16). It is cut in a quartz crystal in one piece with a plate (25) capable of vibrating under the action of an electric stress and extending in a plane parallel to the longitudinal direction of the tubular element inside the latter. Each of the longitudinal edges of the plate is connected by a transverse connecting element (30, 31) to the internal face (14) of the tubular element so as to transmit forces (F1 and F2) resulting from the application of the external pressure to the plate (25) in a direction substantially parallel to its plane and perpendicular to the axis of the tubular element (12).

17 Claims, 8 Drawing Figures

PIEZOELECTRIC PRESSURE AND/OR TEMPERATURE TRANSDUCER

The present invention relates to the measurement of pressures and/or temperatures. It concerns notably the measurement of very high pressures with a high sensitivity.

For such applications, there are prior-art piezoelectric transducers in which the vibration of a crystal under the action of an alternating electric field is used for the measurement of forces applied on a pellet of this crystal whose resonance frequency varies according to the stresses to which it is subjected.

These transducers, while they offer very high sensitivity enabling them to be used for the measurement of small variations in very high pressures, nevertheless have drawbacks. Firstly, the variation in the vibration frequency of the resonator is generally greatly dependent on temperature. They are consequently not easily utilizable when the ambient temperature cannot be controlled.

Furthermore, in prior-art designs, the resonator is a quartz pellet forming a diaphragm within a cylindrical tube cut in the same quartz block with the pellet, the assembly having the form of an H in a longitudinal section plane. The open ends of the tube are closed by cylindrical caps generally glued on the annular terminal faces of this tube. The interior of the casing thus formed is placed under a high vacuum or filled with inert gas. A system of electrodes makes it possible to vibrate the pellet and to measure its resonance frequency. This frequency varies as a function of the pressure applied on the outside of the assembly thus formed through the effect of the forces applied on the periphery of the pellet.

That design has certain drawbacks, notably a machining difficulty owing to the shape of the H-section element. It moreover requires a quartz block of large dimensions entailing costly construction. Difficulties are also encountered at the level of the joint planes between the caps and the tube. In fact, the connecting material between these elements is subjected to stresses. The construction of the device requires particular care in order to minimize the effects of these stresses.

It is the object of the invention to provide a pressure and/or temperature transducer offering improvements as concerns at least one of the drawings mentioned above. It provides notably a transducer which can be constructed in a compact form and easily mounted in a sonde capable of being introduced into the production string of an oil well so as to measure with great accuracy the pressure variations representative of modifications in the flow of the well and the evolution of the producibility of the strata.

For this purpose, the invention provides a pressure and/or temperature transducer of the type comprising a block of piezoelectric material in which are machined an external element subjected to a pressure, and notably to a pressure to be measured, and an internal element capable of vibrating under the action of electric stress, this internal element not being subjected to the direct action of the pressure and connected to the external element to receive the forces corresponding to this pressure. This transducer is characterized notably in that the external element has a tubular shape and the internal element is in the form of a plate placed inside this tubular element in a plane substantially parallel to the longitudinal direction of the tube, the opposite longitudinal edges of this plate each being connected by at least one respective connecting element to the internal face of the tubular element for transmitting to the plate, in a substantially transverse direction, the forces corresponding to the pressure applied to the exterior of the tubular element. The connecting elements thus obtained provide the self-suspension of the plate with respect to the exterior tubular element.

In general, the form of the transducer just described is easier to machine than that of prior-art transducers to the extent that most of the machining operations are carried out in a direction generally parallel to the longitudinal direction of the tubular element. In particular, the machining of the transverse faces inside the tube is minimized or practically eliminated as will be seen below.

The elements connecting the plate to the internal face of the tubular element are preferably substantially perpendicular to the wall of the latter in the extension of the plane of the plate for the transmission of forces parallel to this plane.

According to one embodiment, they are arranged so that the resultants of the forces applied on each side of the plate are directed along the same line of action.

The attachment zones of the connecting elements are preferably elongated parallel to the generatrices of the tube.

They can have a reduced length to concentrate the forces in a particular transverse zone of the vibrating plate. They can also have a relatively large longitudinal dimension so as to produce, for a given external pressure on the tubular element, a relatively high force on the plate.

According to one embodiment, the plate has a rectangular form, its large size being designed with a certain convexity to favor the trapping of the vibration energy according to known principles. The ends of the tubular element are normally closed by end pieces fitted on these ends. It has been noted, that with this embodiment, the shear stresses in the joint plane between the end pieces and the tubular element were substantially lower than in the prior-art designs with an H-section resonator block.

It is moreover possible to design a massive and compact transducer in this way which is easily fitted in measurement apparatus of small diameter, notably in sondes capable of being used in oil wells.

Finally, the transducer of the present invention lends itself remarkably well to the simultaneous measurement of two frequencies corresponding to two transverse vibration modes of the plate, one highly dependent on the forces which are applied to the plate, while the other is practically independent thereof and, consequently, undergoes only the temperature variations. The measurement of this latter frequency can be used to derive from the other frequency a pressure measurement independent of the temperature fluctuations of the transducer. In one embodiment, the forces transmitted to the plate are aligned in a direction substantially perpendicular to the longitudinal direction of the tubular element. Prevision is consequently made to cut the plate in a crystal such as quartz along a cutting plane whose crystallographic axis, or its projection, forms a predetermined angle with the force application direction to obtain the desired effect. The connecting elements transmit forces to the plate in the same longitudinal plane corresponding to the plane of symmetry of the plate. At the same time, it is possible to obtain a sufficient sensitivity to the pressure thanks to the possibility of elongating these connecting elements in the longitudinal direction. Prevision can also be made for placing, in the same block, a second resonator plate in the tubular element, offset longitudinally with respect to the first, and parallel to a plane different from the plane of the first plate. The planes of the two plates are selected according to the cut of the crystal in order to optimize the response of each of them to a respective parameter. For example, the plane of the second plate can be chosen in order to increase the temperature sensitivity of the plate.

Additional explanations and a description of nonlimitative embodiments are given below with reference to the appended drawings in which.

Figure 1:
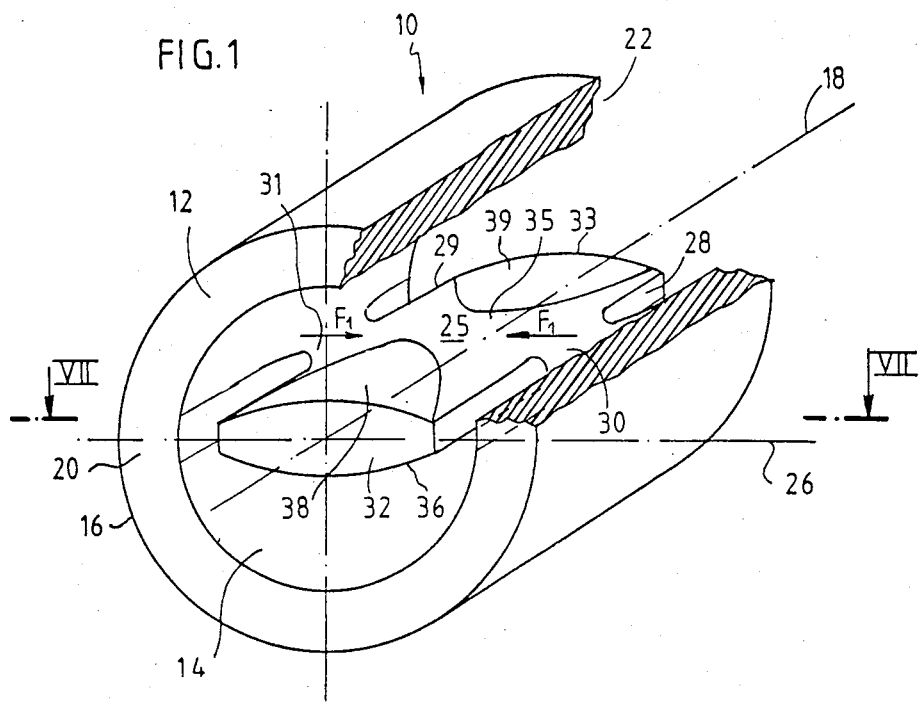
FIG. 1 is a partially cut-away perspective view of an embodiment of the invention.

In one embodiment (FIG. 1), a transducer 10 comprises a tubular element 12 limited internally and externally by circular cylindrical faces 14 and 16 respectively centered on the same axis 18. The end faces of the element 12 are circular rings 20 and 22 respectively in the planes perpendicular to the axis 18. Parallel to this axis extends a plate 25 forming a resonator element mounted inside the tubular element 12. In plan view, this plate has a rectangular form with the larger side parallel to the axis 18. This plate is symmetrical, in the direction of its thickness, with respect to a plane whose trace has been marked at 26 and which corresponds to a diametral plane of the tubular element 12. It is limited laterally by two faces 28 and 29 substantially parallel to the longitudinal dimension of the element 12 and perpendicular to the plane 26. Each of these faces is connected by a connecting bridge respectively 30, 31 to a respective zone of the internal face 14 of the tubular element 12. The assembly of this element, the plate 25 and the connecting bridges 30 and 31 is of unit construction and cut in the same crystal block using a double-rotation cut which will be defined below.

The plate 25 is terminated on each of its ends by two faces respectively 32 and 33 perpendicular to the axis 18. In the example represented in FIG. 1, its length is slightly smaller than that of the tubular element 12. Also in this example, the longitudinal dimension of each of the bridges 30 and 31 is relatively small in relation to this length. It is however to be noted that this dimension of the bridges can be near or equal to the length of the plate 25. When the outer surface 16 of the element 12 is subjected to a pressure, these bridges 30 and 31 transmit two equal and opposite forces F1 and F2 on the same application line parallel to the plane 26 perpendicular to the axis 18 and located substantially in the middle of the longitudinal dimension of the plate 25.

The top face 35 and the bottom face 36 of the plate 25 are slightly convex or bulging so that the plate is thicker in the center than on the edges. This arrangement makes it possible, when the plate 25 is subjected to an electric stress which tends to make it vibrate, to trap the energy maintaining the vibration. In a cross-sectional plane going through the middles of the briges 30 and 31, the section of the top face 35 and the bottom face 36 corresponds substantially to a circular arc substantially up to the level of the side faces 28 and 29. The bridges 30 and 31 can thin out in relation to the height of these lateral faces in the case of a thermometric resonator. Moreover, each of the top and bottom faces has, in a longitudinal section perpendicular to the plane 26, portions such as 38 and 39 which thin out from the vicinity of the central part of each face to the respective end faces 32 and 33, the facets 38 and 39 having approximately the form of a chamfer. It is also possible to provide a radius of curvature along the longitudinal direction of the plate.

Figure 3:
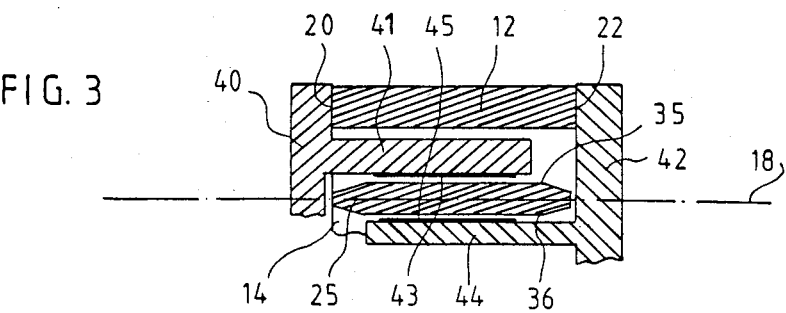
FIGS. 3 and 4 are longitudinal sections respectively of two other variants.

In its assembled structure, the transducer 10 has two terminal caps or end pieces such as 40 and 42 (FIG. 3) which are applied on the terminal faces 20 and 22 of the tubular element 12 and can be secured thereto by gluing for example. The caps 40 and 42 consist essentially of cylindrical pellets which thus provide a sealed closure for the internal space of the tubular element 12 containing the vibrating plate 25, which space can be subjected to a very high vacuum or filled with an inert gas. With the cap 40 is associated a tongue 41 which advances inside the tubular element 12 over the top face 35 of the plate 25. An electrode 43 is formed by a metalization of the bottom face of the tongue 42 opposite the face 35 and a few microns or tens of microns from the latter.

Similarly, a tongue 44 is associated with the cap 42 and carries on its face opposite the bottom face 36 of the plate 25 an electrode 45 at a small distance from the plate 25. When these electrodes are mounted in an oscillating circuit, which can be constituted in a known manner in quartz resonators, the pellet 25 begins vibrating. Its resonance frequency can be measured by the frequency of the electrical oscillations in the circuit in which are mounted the electrodes 43 and 45.

In a material such as piezoelectric quartz, the vibration of the plate 25 takes place according to three modes, namely mode A or the quasi-longitudinal mode and two thickness shear modes (or quasi-transverse) modes B and C. These modes are distinguished by their frequencies, the quasi-longitudinal mode being the fastest and the mode C being slower than mode B. In principle there is a multiplicity of resonance frequencies for a given crystal, notably frequency families for the modes A, B and C. In practice it is possible to pick up, for measurements by means of a transducer according to the invention, one or more frequencies chosen from among the fundamental or partial or anharmonic frequencies of the three modes A, B and C.

The three modes are always present. It is however possible to favor some of these modes at the expense of others, notably by the suitable choice of the cut, of the dimensions of the plate (thickness, length, width, radius of curvature of pieces) and the form of the metalizations.

In principle, the vibration frequency of a quartz resonator pellet depends on the forces applied to it. This force sensitivity however depends on the cut used on the plate 25 and often on the direction of force application.

Figure 5:
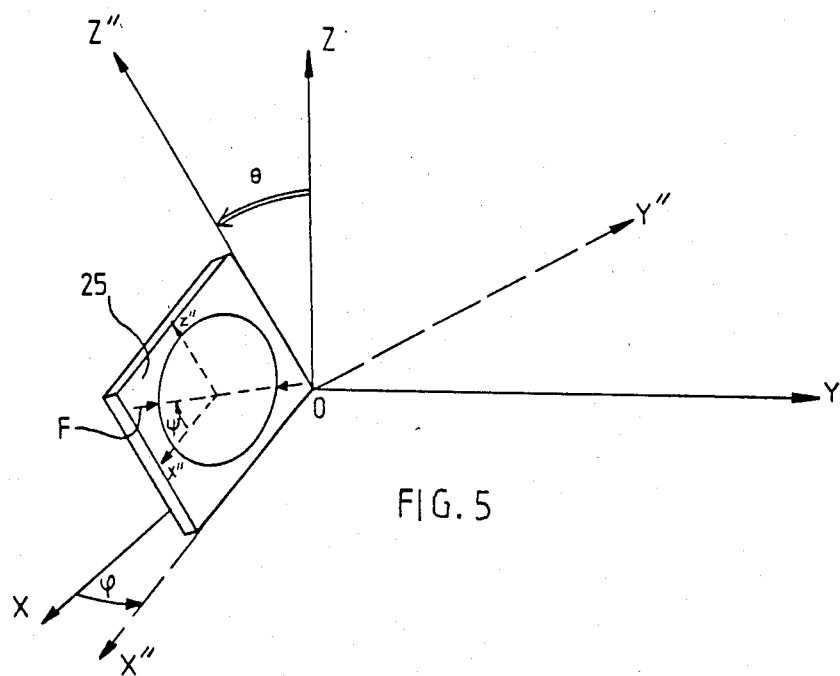
FIG. 5 illustrates the definition of the crystal cuts which can be used for the implementation of the invention.

A quartz crystal has an optical axis OZ and an electrical axis OX (FIG. 5), the parameters of each face being defined with respect to a right-angle trihedral OXYZ in which the axis OY is perpendicular to OX, OZ. The position of the plate 25 has been represented schematically with respect to this trihedral. It can be defined by an angle $\phi$ between the trace OX" of the cut of this plate (plane 26 of FIG. 1) with the axis OX, and by the angle $\theta$ between the axis OZ" of the plate perpendicular to OX" and the optical axis OZ.

A cut defined by two nonzero angles such as $\phi$ and $\theta$ is called a double-rotation cut. A large number of special cuts are known which have characteristic properties. For example, there is the SC (stress compensated) cut defined by the angles $\theta = 33.93°$ and $\phi = 21.93°$.

There is also an X+30° cut defined by the angles $\theta = 34°$ and $\phi = 30°$.

Similarly, there is an SBTC (stress compensated for mode B and temperature compensated for mode C) cut defined by the angles $\theta = 34.5° \pm 2°$ and $\phi = 16.3° \pm 2°$.

It is known that the resonance frequency sensitivity coefficient $K_F$ of a resonator pellet for the force applied to it can be defined by the relationship:

$$K_F(\psi) = \Delta f/f_0 \times 1/F \times H/N$$

where
  $\psi$ is the azimuth of the application direction of the force F (see FIG. 5) with respect to the crystallographic axis OX" of the cut of the plate;
  H is a parameter which is the product of the thickness by the length of the pellet 25;
  N is the frequency constant of the propagated wave;
  $\Delta f$ is the frequency variation observed during the application of the force F in relation to the resonance frequency $f_0$ in the absence of forces.

The frequency also varies considerably with temperature. This variation can be defined in a sufficiently precise manner by the relationship:

$$\Delta f/f_o = a - T - T_0) = b(T - T_0)^2 + c(t - T_0)^3 + \tilde{a}\frac{dT}{dT}$$

where a, b and c are respectively static coefficients; $\tilde{a}$ is the dynamic coefficient of the first order; $T_0$ is a reference temperature (25° C.). The term $\tilde{a}dT/dt$ represents the dynamic and hence transient effect which appears during a rapid variation in the temperature T of the crystal.

Figure 6:
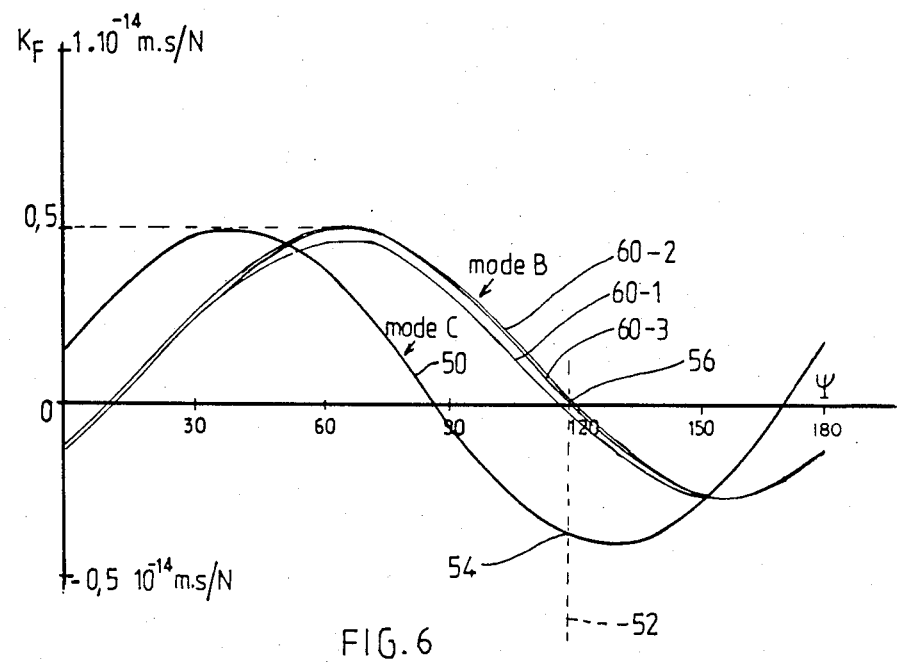
FIG. 6 is a diagram illustrating the variations in the force sensitivity of the transverse vibration frequency of a quartz element vibrating according to two different modes.

FIG. 6 represents, for an SC cut, the variations in the sensitivity coefficient $K_F$ as a function of the azimuth $\psi$ between 0° and 180° for the vibration modes C (curve 50) and B (curves 60-1, 60-2, 60-3). These three curves are obtained for cuts which are not very different, defined by the following angular parameters:
  Curve 60-1: $\phi = 22° \theta = 34°$
  Curve 60-2: $\phi = 22° \theta = 34.5°$
  Curve 60-3: $\phi = 21° \theta = 34.5°$ It will be noted that the variations in the angle $\theta$ are more striking on the force sensitivity in mode B than those of the angle $\phi$.

The observation of this figure makes it possible to note that, if the force application directions as defined by the broken line 52 parallel to the axis of the sensitivities $K_F$ forms an angle of about 118° with the axis OX", the sensitivity of the vibration in mode B to the forces (point 54 of curve 50) is near one of the two maxima (in absolute value) of the curve 50 which presents an approximately sinusoidal shape. For mode B, on the other hand, this sensitivity (point 56) of the curve 60 is practically zero.

On the basis of this remark, an advantageous embodiment of the invention provides for the choice of the direction of application of the forces by the connecting elements such as the bridges 30 and 31 to the vibrating plate 25 as a function of the pressure exerted around the tubular element 12 in a direction whose azimuth is suitably chosen, taking into account the cut adopted for the crystal 10, so as to obtain a high sensitivity of the resonator to the pressure for one of the vibration modes and practically zero for the other.

Figure 7:
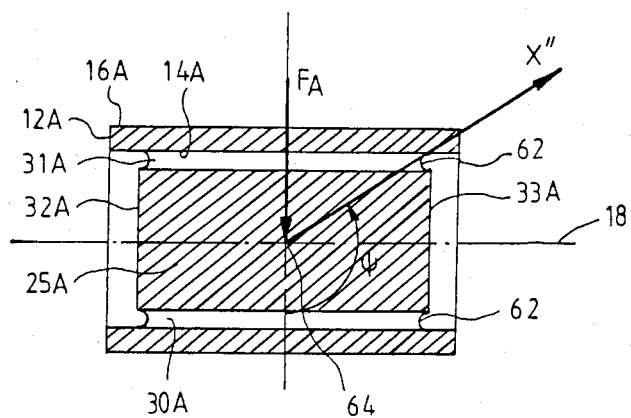
FIG. 7 is a view of a variant along a section marked VII—VII in FIG. 1.

This choice has been illustrated in FIG. 7 for an embodiment variant of the transducer of FIG. 1 in which the plate 25A is connected to the tubular element 12A by connecting elements 30A and 31A which extend over almost the entire length of the plate 25A. Only slots 62 are provided on each end of the connecting elements 32A and 33A of the plate and the internal wall 14A of the element 12A. In this embodiment, the resulting force $F_A$ transmitted by each of the elements 30A and 31A is contained, as previously, in the plane of symmetry of the plate. However, in relation to the example of FIG. 1, its intensity is greater as it results from the application of the external pressure by the tubular element 12A over a greater longitudinal length of the plate for the same thickness of the bridges 30, 31 and 30A, 31A.

In FIG. 7 is illustrated an angle $\psi$ which, once chosen in accordance with the considerations mentioned earlier with respect to FIG. 6, determines the manner in which the quartz crystal in which the transducer is formed must be cut so that the crystallographic access X" of the adopted cut occupies the position shown in this figure.

Thus, the connecting elements of a transducer with a longitudinal rectangular plate as described make it possible, when conditions so require, to select the direction of force application on the vibrating plate so as to obtain a high or maximum sensitivity of one of the modes to these forces while the other is practically sensitive only to temperature variations. The measurements coming from this latter mode can then be used to compensate the measurements obtained on the other mode for the effect of temperature variations. This possibility is altogether desirable for a transducer intended to be used in an underground well, for example a hydrocarbon production well. It is fact then possible to obtain very high pressure measurements with a high resolution, in a very accurate manner thanks to the corrections which can be made according to the temperature of the crystal itself, as measured from mode B. The transducer can also be used to furnish a temperature measurement.

Of course, the example just described in relation to FIG. 6 is not limitative. In particular, any crystal cut, and notably a double-rotation or triple-rotation cut which makes it possible to select the force sensitivity of one or the other mode, can be used. It is moreover understood that the invention applies in an altogether satisfactory manner with the cuts of the piezoelectric crystal whose sensitivities in mode B and in mode C have been specially selected to favor the measurement of one parameter independently of the other, for example the SC and X+30° cuts mentioned earlier.

While FIGS. 1 and 7 represent two embodiments of connecting elements between the vibrating plate 25 and the tubular element 12 on the outside of which the pressure is applied, it will be noted that other embodiments are possible, notably in which several force transmission bridges are used on at least one side of this plate, the number of bridges on each side being identical or different. Similarly, if the rectangular form of the plate 25 turns out to be favorable from the machining viewpoint, other types of plates in planes substantially parallel to the longitudinal direction of the tubular element can be used.

Figure 2:
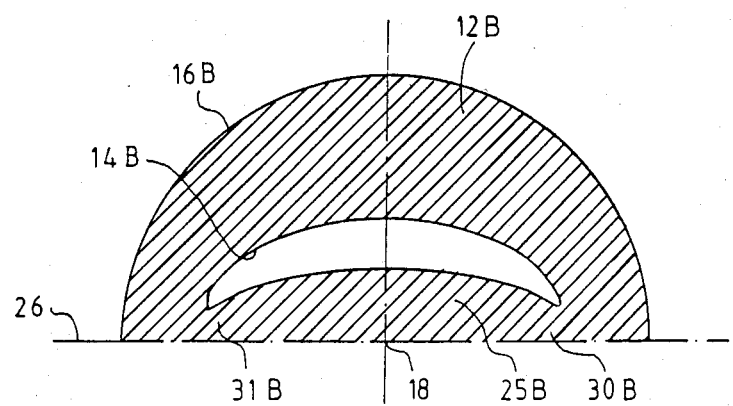
FIG. 2 is a partial cross section of a variant.

In the embodiment of FIG. 2, a tubular element 12B, connected to a plate of longitudinal direction 25B by the lateral connecting elements 30B and 31B, has a substantially cylindrical circular external surface, while its internal face 14B has an elliptical section which is elongated in the direction of alignment of the connecting elements 30B and 31B. Thus, the thickness of the element 12 is greater in a longitudinal plane perpendicular to the plane 26 than in the latter. The ability to obtain an elliptical face such as 14B represents an internal geometry possibility for the transducer, preventing any extension stresses at any point of the crystal. The machining can be carried out ultrasonically with automatic programing of tool movements.

The arrangement of the electrodes on elements such as 41 and 44 placed opposite the plate 25 (FIG. 3) offers the advantage that the surface finish of the top faces 35 and 36 of this plate is not affected by the presence of such electrodes and makes it possible to avoid the migration of metallic ions in the vibrating crystal and to minimize hysteresis phenomena. This is a factor contributing to the small drift of the performance of the transducer with respect to time (BVA). Of course, in a simplified embodiment, it is possible to simply place the electrode directly on the surface of the vibrating crystal.

Figure 4:
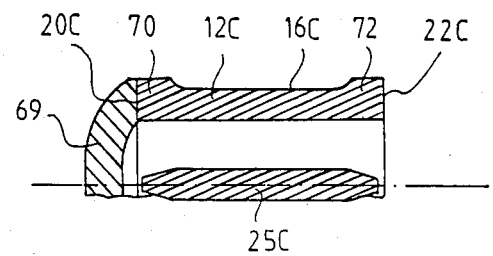

In FIG. 4 has been represented an embodiment variant in which the ends 70 and 72 of a tubular element 12C transmitting the pressure to a plate 25C similar to the plate 25 of FIG. 1, have extra thicknesses on the side of the external face 16C. The result is that the end faces 20C and 22C of the element 12C in the form of a ring have a connecting surface with closing caps or end pieces such as 69 which can be enlarged in relation to the cross section of the tube in its central part. According to the embodiment represented, the closing end pieces or caps 69 on the open ends of the tubular elements 12 are in the form of a bonnet with an elliptical or pseudo-spherical longitudinal cross section.

In general, it has been noted that the vibrations of the plate in the embodiments just described cause only very small and even negligible shear stresses at the level of the joint planes between the ends of the force-transmitting tubular element and the caps or end pieces which close off the ends. The result is notably that the performance of the latter, essential for maintaining the vacuum, remains excellent with respect to time and favors long-term stability. It has also been observed that the hysteresis phenomena which are usually related, in quartz resonators, to the existence of materials such as glues in the joint planes are altogether reduced and even eliminated in the considered embodiment. These advantages are obtained without requiring the elongation of the tubular element 12 in a significant manner beyond the longitudinal dimensions of the plate 25.

It is thus possible to obtain a pressure transducer which can be very compact while having excellent pressure sensitivity, good aging characteristics and offering the possibility of measuring temperature or of taking other parameters into account in the measurement. The typical dimensions of a transducer capable of being used in a pressure measurement sonde in a well according to the embodiment described are the following:

Outer diameter: 22 mm
Central body length: 16 mm
Diameter of caps: 22 mm
Thickness: 7 mm The vibration frequency of such a transducer in modes B and C can be 5.5 MHz and 5 MHz for example. It is to be noted that a transducer designed according to the invention can have reduced dimensions. In this case, the result is that the resonant frequencies are much higher, for example of the order of 100 MHz.

Figure 8:
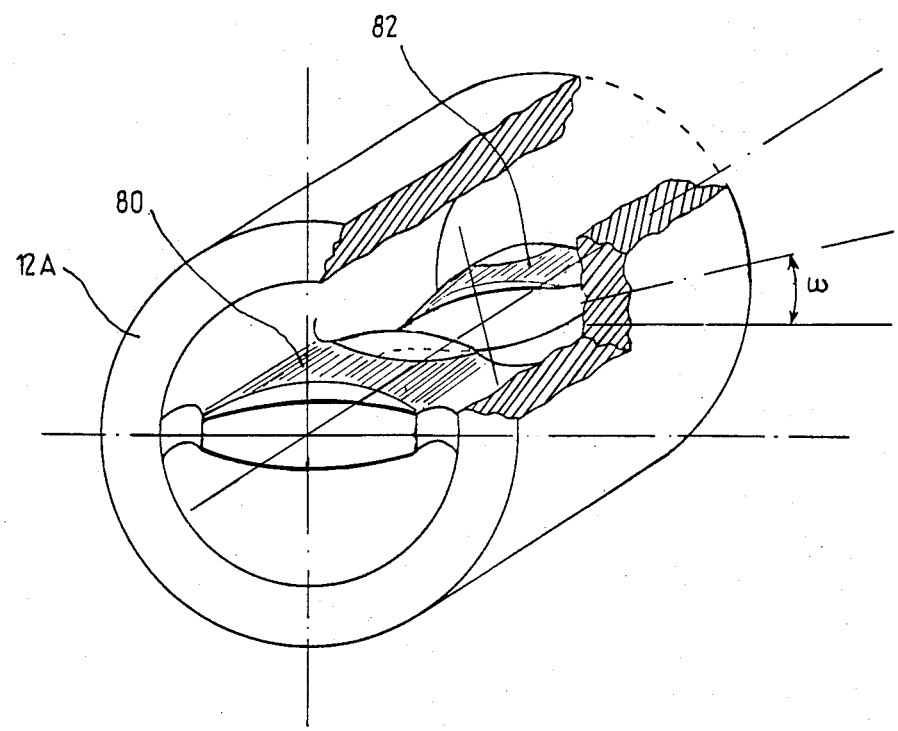
FIG. 8 is a partially cut-away perspective view of a second embodiment of the invention.

In FIG. 8 has been illustrated a second embodiment of the invention comprising two rectangular plates 80 and 82, similar to the plate 25 of FIG. 1, offset longitudinally inside the tubular body 12A and parallel to different planes (angle $\omega$). Thus, in this embodiment, there are two resonators, each corresponding to a particular cut of the crystal. For example, the cut of the first resonator corresponds to ($\phi 1$, $\theta 1$) (see FIG. 5) and the second resonator corresponds to ($\phi 2$, $\theta 2$). The two plates 80 and 82 form a structure of unit construction with the tubular element 12A. They are thus practically always at the same temperature, namely the temperature of the crystal. Their dimensions can be equal or different depending on whether one desires their resonant frequencies to be identical or not. This arrangement makes it possible to obtain an additional degree of freedom in the optimization of characteristics which determine the sensitivity of the transducer to parameters such as pressure or temperature. If a set of curves such as 50 and 60 in FIG. 6 is obtained for plate 80, a different set is obtained for plate 82 and the angle $\psi$ is also different. It is thus possible to operate in a differential mode or to provide other combinations of output frequencies for modes sensitive to pressure and/or modes sensitive to temperature. It is noted that in the case of a transducer designed to be used in a well, the end-to-end mounting of two, or more, resonating plates is not troublesome from the standpoint of dimensions, the stresses in this area being especially in the transverse dimension.

We claim:

1. Piezoelectric transducer, notably for pressure and/or temperature of the type comprising a block of piezoelectric material having an external element (12) sensitive to a pressure and notably to a pressure to be measured and at least one internal element (25) capable of vibrating under the action of an electric stress, the internal element normally not being subjected to the direct action of said pressure and connected to the external element to receive forces corresponding to this pressure, characterized in that the external element (12) has a tubular form designed to receive the pressure on its external face (16) and the internal element is in the form of a plate (25) placed in the tubular element in a plane substantially parallel to its longitudinal direction, the opposite longitudinal edges of this plate each being connected by a respective connecting element (30, 31) to the internal face of the tubular element (16) for the transmission of said forces to the plate in a transverse direction.

2. Transducer according to claim 1 wherein the plate is cut in a plane having a crystallographic axis, characterized in that the connecting elements (30, 31) transmit the forces to the plate (25) in directions selected in relation to the crystallographic axis so that the vibration frequency sensitivity of the plate (25) to the force is high in a first transverse vibration mode and negligible in a second transverse vibration mode.

3. Transducer according to either of claims 1 or 2, characterized in that the connecting elements (30, 31) linking the plate (25) to the internal face (14) of the tubular element (12) are substantially perpendicular to this wall in the extension of the plane of the plate for the transmission of said forces parallel to this plane (26).

4. Transducer according to claim 3, characterized in that the zones of attachment of the connecting elements (30, 31) to the internal face of the tubular element (12) are elongated parallel to its generatrices.

5. Transducer according to claim 4, characterized in that the plate (25) has, in plan view, a substantially rectangular form.

6. Transducer according to claim 5, characterized in that the connecting elements (30, 31) have a reduced longitudinal dimension in relation to the length of the rectangular plate.

7. Transducer according to claim 6 characterized in that the large faces (35, 36) of the plate (25) are convex in cross section and the plate (25) thins out longitudinally in the direction of each of its ends (32, 33).

8. Transducer according to claim 7, characterized in that the tubular element (12) is closed on both ends by end pieces (40, 42), at least one of these end pieces supporting an element (42) penetrating into the tubular element (12) on which an electrode is placed at a small distance from one of the respective large faces (35, 36) of the plate (25).

9. Transducer according to claim 8, characterized in that the tubular element is closed on at least one of its ends by an end piece of ellipsoidal shape (69).

10. Transducer according to claim 9, characterized in that the tubular element (12) has a thick part on each of its ends in which is formed the joint plane with an end piece closing off this end.

11. Transducer according to claim 10, characterized in that the internal face of the tubular element (12) has a substantially elliptical cross section which is elongated parallel to the plane of the plate.

12. Transducer according to claim 11, characterized in that the longitudinal dimension of the plate (25) is slightly smaller than the longitudinal dimension of the tubular element (12).

13. Transducer according to claim 11, characterized in that the connecting elements (30A, 31A) of the plate have a longitudinal dimension similar to that of this plate.

14. Transducer according to claim 14, characterized in that it comprises a single connecting element (30, 31) on each longitudinal side of the plate, these elements being arranged to transmit two equal and opposite forces to the plate (25).

15. Transducer according to claim 14, characterized in that at least one of the longitudinal edges of the plate (25) is connected to the internal face of the tubular element (12) by several connecting elements.

16. Transducer according to claim 15, characterized by a second plate (82) forming a structure of unit construction with said tubular element (12A) and offset longitudinally with respect to the first plate (80) inside the tubular element (12A) and parallel to a plane different from that of this first plate.

17. Transducer according to claim 16, characterized in that the orientation of the plane of the second plate (82) is selected so that the cut of this plate has predetermined characteristics in relation to that of the first plate as concerns its vibratory properties as a function of the parameters to which the transducer may be subjected.

* * * * *